(12) United States Patent
Fetsko et al.

(10) Patent No.: US 8,479,876 B2
(45) Date of Patent: Jul. 9, 2013

(54) SOUND DAMPING PATCH

(75) Inventors: Stephen A. Fetsko, Medina, OH (US);
James F. Keys, Northville, MI (US);
Jonathan W. Fisk, Canton, MI (US);
Paul A. Andel, Lagrange, OH (US);
Kris Morris, Roseville, MI (US)

(73) Assignee: Shiloh Industries, Inc., Valley City, OH (US)

( * ) Notice: Subject to any disclaimer, the term of this patent is extended or adjusted under 35 U.S.C. 154(b) by 0 days.

(21) Appl. No.: 13/157,360

(22) Filed: Jun. 10, 2011

(65) Prior Publication Data

US 2011/0315473 A1    Dec. 29, 2011

Related U.S. Application Data

(60) Provisional application No. 61/355,410, filed on Jun. 16, 2010.

(51) Int. Cl.
*F16F 15/00* (2006.01)

(52) U.S. Cl.
USPC ............................................ 181/207; 181/211

(58) Field of Classification Search
USPC .................... 181/204, 205, 207, 208, 211
See application file for complete search history.

(56) References Cited

U.S. PATENT DOCUMENTS

| | | | |
|---|---|---|---|
| 2,237,623 A | 4/1941 | Ledwinka | |
| 3,649,430 A | 3/1972 | Lewis et al. | |
| 4,223,073 A | 9/1980 | Caldwell et al. | |
| 4,498,433 A * | 2/1985 | Ogawa | 123/90.38 |
| 4,522,165 A * | 6/1985 | Ogawa | 123/195 C |
| 4,655,496 A | 4/1987 | Gahlau et al. | |
| 4,705,139 A | 11/1987 | Gahlau et al. | |
| 4,735,284 A * | 4/1988 | Gahlau et al. | 181/290 |
| 4,851,271 A | 7/1989 | Moore, III et al. | |
| 5,143,755 A | 9/1992 | Moore, III et al. | |
| 5,195,795 A | 3/1993 | Cannera et al. | |
| 5,196,253 A * | 3/1993 | Mueller et al. | 428/138 |
| 5,233,832 A | 8/1993 | Moore, III | |

(Continued)

FOREIGN PATENT DOCUMENTS

| | | |
|---|---|---|
| FR | 2780321 A1 | 12/1999 |
| JP | 2206544 | 8/1990 |
| JP | 10331392 | 12/1998 |
| JP | 2001145978 | 5/2001 |

OTHER PUBLICATIONS

Written Opinion & International Search Report for PCT/US11/39939 Feb. 17, 2012, 11 pages.

*Primary Examiner* — Jeremy Luks
(74) *Attorney, Agent, or Firm* — Reising Ethington P.C.

(57) ABSTRACT

A panel assembly for use in any number of different applications, including a variety of vehicle applications, that reduces noise or vibrations, provides thermal insulation, and/or improves structural integrity. According to an exemplary embodiment, the panel assembly includes a main panel made from a metal, one or more sound damping patches also made from a metal, and an adhesive layer that joins the patches to the main panel in a constrained layer construction. The sound damping patches may include one or more forming features, which are designed to improve the formability of the panel assembly without significantly impairing its sound damping characteristics. There are different types of forming features, including internal forming features (e.g., openings, holes, slits, slots, etc.) located within the interior of the patch and external forming features (e.g., projections, fingers, recesses, waveforms, etc.) located along the perimeter of the patch.

21 Claims, 5 Drawing Sheets

U.S. PATENT DOCUMENTS

| | | | |
|---|---|---|---|
| 5,271,142 A | 12/1993 | Moore, III et al. |
| 5,347,810 A | 9/1994 | Moore, III |
| 5,407,034 A | 4/1995 | Vydra et al. |
| 5,416,962 A | 5/1995 | Passarella |
| 5,418,073 A | 5/1995 | Loth et al. |
| 5,557,078 A | 9/1996 | Holwerda |
| 5,590,524 A | 1/1997 | Moore, III et al. |
| 5,631,451 A | 5/1997 | Torisaka et al. |
| 5,796,055 A | 8/1998 | Benson, Jr. et al. |
| 5,842,686 A | 12/1998 | Hansen et al. |
| 5,851,342 A | 12/1998 | Vydra et al. |
| 5,975,609 A | 11/1999 | Campbell |
| 5,979,964 A | 11/1999 | Ban et al. |
| 6,024,190 A | 2/2000 | Ritzema |
| 6,089,349 A | 7/2000 | Aye |
| 6,092,854 A | 7/2000 | Campbell |
| 6,103,152 A | 8/2000 | Gehlsen et al. |
| 6,109,481 A | 8/2000 | Alexander et al. |
| 6,202,462 B1 | 3/2001 | Hansen et al. |
| 6,302,466 B1 | 10/2001 | Zwick |
| 6,368,438 B1 | 4/2002 | Chang et al. |
| 6,375,255 B1 | 4/2002 | Maruta et al. |
| 6,435,590 B2 | 8/2002 | Miyahara et al. |
| 6,455,146 B1 | 9/2002 | Fitzgerald |
| 6,465,110 B1 | 10/2002 | Boss et al. |
| 6,481,545 B1 | 11/2002 | Yano et al. |
| 6,482,496 B1 * | 11/2002 | Wycech ............ 428/71 |
| 6,520,134 B1 * | 2/2003 | Plunkett et al. ........ 123/90.38 |
| 6,589,607 B1 | 7/2003 | Edwards et al. |
| 6,592,968 B1 | 7/2003 | Schmit et al. |
| 6,621,658 B1 | 9/2003 | Nashif |
| 6,722,720 B2 | 4/2004 | Donick et al. |
| 6,790,520 B1 * | 9/2004 | Todd et al. .......... 428/318.4 |
| 6,805,219 B2 | 10/2004 | Yasuda et al. |
| 6,827,394 B2 | 12/2004 | Watanabe et al. |
| 6,869,138 B2 | 3/2005 | Rhodes et al. |
| 7,040,691 B1 | 5/2006 | Jacobs et al. |
| 7,048,330 B2 | 5/2006 | Daniel |
| 7,070,848 B2 | 7/2006 | Campbell |
| 7,094,478 B1 | 8/2006 | Griffey et al. |
| 7,121,609 B2 | 10/2006 | Tame |
| 7,125,613 B1 | 10/2006 | Tullis et al. |
| 7,172,800 B2 | 2/2007 | Boss |
| 7,186,442 B2 | 3/2007 | Myers et al. |
| 7,218,189 B2 | 5/2007 | Pahl |
| 7,219,946 B2 | 5/2007 | Tame et al. |
| 7,288,290 B2 | 10/2007 | Chao et al. |
| 7,291,241 B2 | 11/2007 | Dunlap |
| 7,360,520 B2 | 4/2008 | Tullis et al. |
| 7,364,221 B2 | 4/2008 | Tahri et al. |
| 7,393,575 B2 | 7/2008 | Boss |
| 7,444,874 B2 | 11/2008 | Goetchius |
| 7,484,785 B2 | 2/2009 | Weber |
| 7,585,559 B2 | 9/2009 | Schroeder et al. |
| 7,748,184 B1 | 7/2010 | Wheeler et al. |
| 7,784,165 B2 | 8/2010 | Xiao et al. |
| 7,919,174 B2 | 4/2011 | Ruokolainen et al. |
| 2004/0018353 A1 | 1/2004 | Czaplicki et al. |
| 2004/0055813 A1 * | 3/2004 | Tsuiki et al. ................. 181/204 |
| 2004/0058181 A1 | 3/2004 | Garnault et al. |
| 2004/0076841 A1 | 4/2004 | Sauer et al. |
| 2004/0110905 A1 | 6/2004 | Kubota et al. |
| 2004/0129493 A1 | 7/2004 | Campbell |
| 2004/0138321 A1 | 7/2004 | Hashimoto et al. |
| 2004/0157079 A1 | 8/2004 | Cittadini |
| 2004/0214008 A1 | 10/2004 | Dobrusky et al. |
| 2005/0019590 A1 | 1/2005 | Josefsson |
| 2005/0139416 A1 * | 6/2005 | Niwa et al. .................... 181/207 |
| 2005/0217933 A1 * | 10/2005 | Sung Young et al. ......... 181/290 |
| 2006/0134449 A1 | 6/2006 | Sigler et al. |
| 2006/0137944 A1 | 6/2006 | Denys |
| 2006/0169341 A1 | 8/2006 | Goetchius et al. |
| 2006/0169557 A1 | 8/2006 | Goetchius |
| 2006/0266385 A1 | 11/2006 | Malaker |
| 2007/0186614 A1 | 8/2007 | Pinard |
| 2007/0197713 A1 | 8/2007 | Miyawaki et al. |
| 2008/0236739 A1 | 10/2008 | Ashley |
| 2008/0245126 A1 | 10/2008 | Huther |
| 2008/0248274 A1 | 10/2008 | Hierholz |
| 2009/0127026 A1 | 5/2009 | Mandos et al. |
| 2009/0142538 A1 | 6/2009 | Sigler et al. |
| 2009/0183821 A1 | 7/2009 | Schroeder et al. |
| 2009/0249627 A1 | 10/2009 | Xiao |
| 2009/0252989 A1 | 10/2009 | Swanson et al. |
| 2009/0269562 A1 | 10/2009 | Roelofs et al. |
| 2010/0013255 A1 | 1/2010 | Mantovani et al. |
| 2010/0132110 A1 | 6/2010 | Schwaegler |

* cited by examiner

SOUND DAMPING PATCH

REFERENCE TO RELATED APPLICATIONS

This application claims the benefit of U.S. Provisional Ser. No. 61/355,410 filed on Jun. 16, 2010. The entire contents of which are incorporated herein by reference.

TECHNICAL FIELD

The present invention generally relates to a sound damping patch for reducing noise and/or vibrations and, more particularly, to a sound damping patch that is attached to a metal part so that both the patch and the part can be stamped, drawn or otherwise formed together.

BACKGROUND

Articles that have been damped for sound can include some type of viscoelastic material applied to a vibratory article, such as an automotive component. The viscoelastic material absorbs and dissipates the vibrational energy generated by the article by converting mechanical energy associated with the vibrations into thermal energy that is dispersed within the sound damping material layer, and thus reduces the noise associated therewith. There are several different structures commonly used for sound damping purposes, including: free-layer structures, constrained-layer structures, and laminates.

Free-layer structures are structures where a sound damping viscoelastic material by itself is applied to the surface of a vibratory article. In such an arrangement, vibratory or acoustical energy created by a noise or vibration source on one side of the article is dissipated in the adjacent viscoelastic layer so that it is attenuated. In the case of constrained-layer structures, the sound damping viscoelastic material may act as an adhesive and is sandwiched between the vibratory article and an additional rigid constraining layer. The vibration damping is generally due to relative movement between the vibratory article and the rigid constraining layer which causes a shearing movement in the viscoelastic material which translates into heat energy. Sound damping laminates perform much in the same way as constrained-layer structures, however the vibratory article includes a pair of thin constraining layers with a viscoelastic adhesive layer therebetween.

SUMMARY

According to one aspect, there is provided a panel assembly that comprises a main panel, a sound damping patch, and an adhesive layer that joins the sound damping patch to the main panel. The sound damping patch includes at least one forming feature that assists with formability during a metal forming process, and the sound damping patch reduces noise or vibrations in the panel assembly.

According to another aspect, there is provided a method of forming a panel assembly. The method may comprise the steps of: (a) providing a main panel; (b) providing a sound damping patch, wherein the sound damping patch includes at least one forming feature that assists with formability during a metal forming process; and (c) joining the sound damping patch to the main panel with an adhesive layer to form the panel assembly.

DESCRIPTION OF THE DRAWINGS

A preferred exemplary embodiment of the invention will hereinafter be described in conjunction with the appended drawings, wherein like designations denote like elements, and wherein.

DESCRIPTION OF PREFERRED EMBODIMENT

The sound damping patch described herein may be used in any number of different applications in order to reduce noise or vibrations, provide thermal insulation, and/or improve the structural integrity of the underlying part. Although the sound damping patch is described below in the context of various vehicle applications, it should be appreciated that it is not so limited and may be used with various non-vehicle applications as well. Some potential examples include aerospace applications, marine applications, military applications, farm and construction equipment, home appliances, as well as any other application where it is desirable to reduce noise or vibrations in a metal part.

Figures 1A, 1B, 1C:
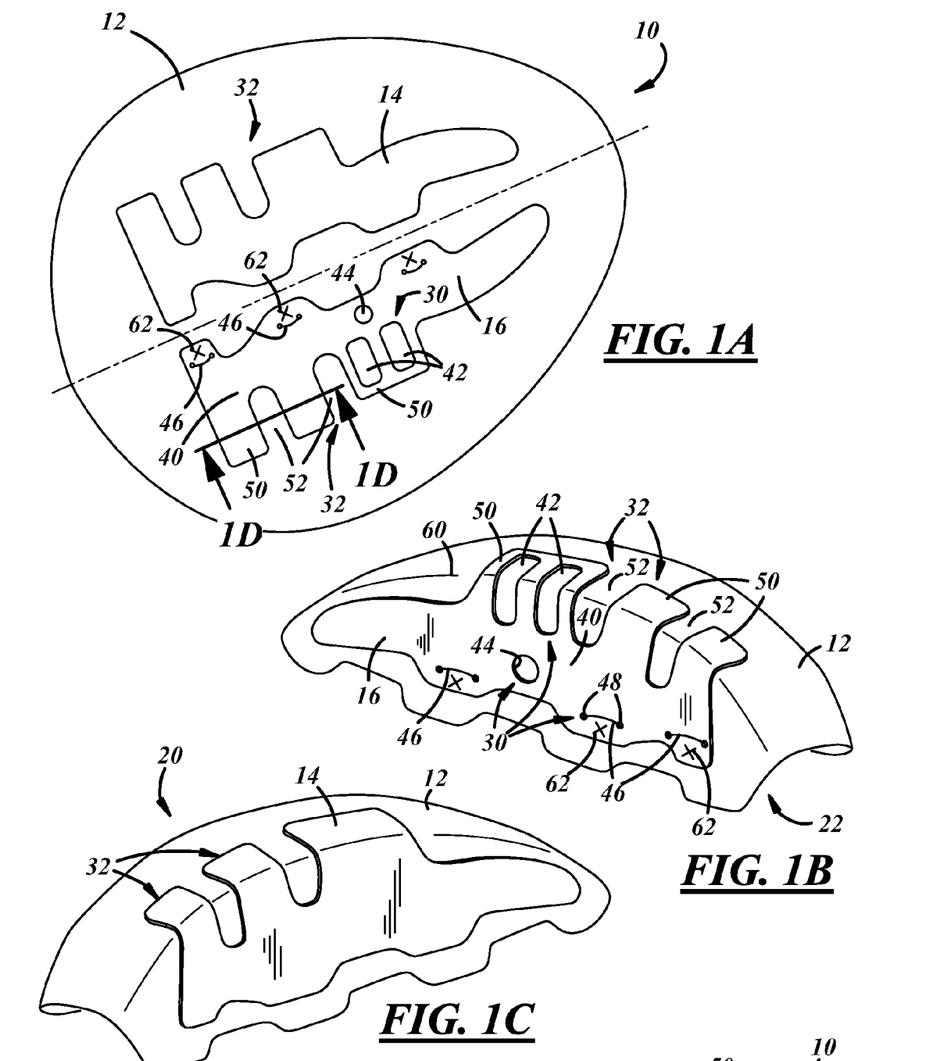
FIG. 1A is a plan view of an exemplary panel assembly before it is subjected to a metal forming process, the panel assembly includes a main panel and two separate sound damping patches.
FIGS. 1B and 1C are perspective views of portions of the exemplary panel assembly of FIG. 1A after the panel assembly has been formed into a pair of vehicle wheel wells.
Figure 1D:
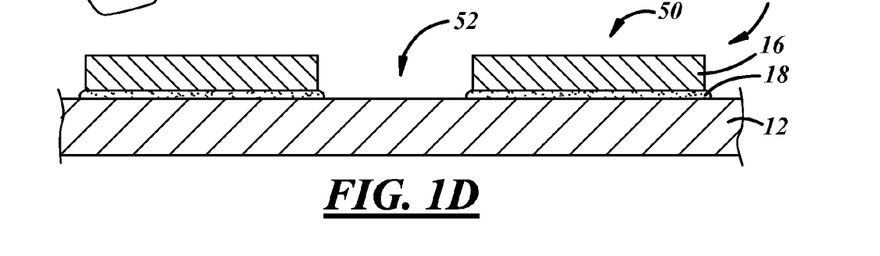
FIG. 1D is a cross-sectional view of the exemplary panel assembly of FIG. 1A taken along lines 1D.

FIG. 1A shows a panel assembly 10 before it is stamped, where the panel assembly includes a main panel 12, a pair of patches 14, 16, and an adhesive layer 18 (shown in FIG. 1D) that adheres the patches to the main panel. FIGS. 1B-C show the panel assembly once it has been formed into sound damped parts 20, 22, which in this case are wheel wells for a vehicle. And FIG. 1D shows a cross-section of panel assembly 10, where the cross-section is taken from FIG. 1A and includes main panel 12, patch 16 and adhesive layer 18. Other potential vehicle applications for the sound damping patch include seat tubs, spare wheel tubs, dash panels, plenums, cowls, roof panels, floor pans, hoods, deck lids, door inners, parcel shelves, oil pans, covers and housings for various engine and transmission components, as well as other vehicle and non-vehicle applications. Some non-limiting exemplary applications for the sound damping patch are taught in U.S. Patent Application Nos. 61/232,988 filed Aug. 11, 2009; 61/253,795 filed Oct. 21, 2009; and 61/307,158 filed Feb. 23, 2010, all of which are incorporated herein by reference.

Main panel 12 acts as the structural foundation for the underlying part or component being formed and can be blanked, cut, sheared or otherwise formed into a desired shape. In this exemplary embodiment, main panel 12 starts out in the form of a generally oblong or oval blank (FIG. 1A) and results in a pair of curved or contoured wheel wells (FIGS. 1B-C). It is not necessary for sound damped parts 20, 22 to be manufactured together, as demonstrated here; they could be produced individually as well. Main panel 12 is typically larger than sound damping patches 14, 16 and may be made from any number of suitable materials, including various types and alloys of metal such as steel (e.g., cold rolled steel, hot dipped steel, electro-galvanized steel, galvanneal, etc.) and aluminum. In certain exemplary embodiments, main panel 12 is made from steel and has a thickness between 0.4 mm-3.0 mm. However, the exact size, shape, thickness and composition of main panel 12 is largely driven by the particular part that is being formed, and certainly may differ from the exemplary embodiments shown and described here.

Patches 14, 16 are applied to main panel 12 with adhesive layer 18 and may reduce or mitigate the noise or vibrations in the wheel well. Patches 14, 16—which can be referred to as sound damping patches—may be blanked, cut, sheared or otherwise formed into any number of shapes and sizes, but are usually designed to be near a noise source. For instance, in the embodiment shown in FIGS. 1A-D, patches 14, 16 are attached to inner walls of the wheel wells so that they dampen or minimize noise and vibrations emanating at the wheels or corners. Although patches 14, 16 are shown here being located on the passenger compartment side of the part (i.e., the side of the wheel well facing the passenger compartment and not facing the wheel itself), it is also possible for them to be attached to the opposite side of main panel 12 such that they are exposed to the wheel. Patches 14, 16 may be attached to both sides of main panel 12 such that they face both the passenger compartment and the wheel. Patches 14, 16 may be constructed from any number of suitable materials, including various types and alloys of metal such as steel (e.g., cold rolled steel, hot dipped steel, electro-galvanized steel, galvanneal, etc.) and aluminum. In one embodiment, patches 14, 16 have a thickness or gauge that is thinner than that of the underlying main panel 12 and is between 0.2 mm-2.0 mm. However, the exact size, shape, thickness and composition of the patch can certainly differ from the exemplary embodiments shown and described here.

Adhesive layer 18 bonds sound damping patches 14, 16 to main blank 12 and can, depending on its composition and the particular application in which it is used, perform other functions such as vibration and/or noise damping. According to one exemplary embodiment, adhesive layer 18 is a viscoelastic adhesive layer that is comprised of an acrylate-based thermoset resin and has a thickness of about 0.005 mm to 0.05 mm; however, other adhesive compositions and thicknesses may be used as well. The panel assembly 10, with its main panel 12, patch 14 and adhesive layer 18, may operate in a constrained damping layer capacity. Skilled artisans will appreciate that constrained damping layer constructions can dissipate or otherwise mitigate vibrational energy by utilizing shear and strain within the sandwich-like construction to convert vibrations into low-grade frictional heat.

As mentioned above, FIGS. 1A and 1D are illustrations of a pre-formed panel assembly 10 having a main panel 12 and sound damping patches 14, 16, while FIGS. 1B-C are illustrations of the same panel assembly after it has been stamped or otherwise formed. Sound damping patches 14, 16 are provided with various types of exemplary "forming features," which are designed to improve the formability of panel assembly 10 without significantly impairing its sound damping characteristics. There are different types of forming features, as is explained below. For example, patch 16 is provided with both internal forming features 30 and external forming features 32, while patch 14 is only provided with external forming features 32. Typically, parts that are the mirror images of one another would have the same basic features, however, patches 14, 16 are shown here with different combinations of forming features in an effort to illustrate some of the different combinations that are possible. The following description of patch 16 is applicable to patch 14 as well.

In the exemplary embodiment shown here, patch 16 includes a main panel area 40, several internal forming features 30 in the form of openings 42, a hole 44, and slits 46, and several external forming features 32 in the form of projections 50 and recesses 52. Main panel area 40 is preferably sized and shaped so that when patch 16 is located on the wheel well, it adequately covers that portion of the wheel well from which noise or vibrations emanate. By using patch 16, instead of making the entire wheel well out of a laminate material, sound damped part 22 may enjoy a cost savings and/or a weight reduction (less material), yet still exhibit suitable noise vibration and harshness (NVH) characteristics and desirable stiffness and structural qualities, to cite several potential attributes. In addition, the use of a patch in place of a full laminate may avoid welding through an adhesive layer, such as adhesive layer 18, which can require special outgassing ventilation and other equipment in the manufacturing facility.

An internal forming feature 30 broadly includes any hole, slit, slot and/or other opening in the interior of the patch that assists with formability during a stamping, drawing or other metal forming process. As explained below in more detail, when a panel assembly 10 is put through a metal forming process, main panel 12 may experience different forces (e.g., expansion forces, compression forces, strain, etc.) than patches 14, 16. This may cause the material in main panel 12 and patches 14, 16 to expand or contract at different rates, and can be further complicated by the fact that an adhesive layer 18 and one or more welds are bonding the two layers together. Thus, internal forming features 30 may relieve force or strain on panel assembly 10 by providing means for expansion in an expansion zone (i.e., an area where the patch is being pulled or is expanding) and means for compression in a compression zone (i.e., an area where the patch is being pushed together or is compressing). Openings 42, hole 44 and slits 46 are all examples of interior forming features that may be used in an expansion zone, as they all permit patch 16 to expand or spread without tearing or ripping at that location. In a compression zone, however, openings 42 and/or hole 44 should be used, as slits 46 are simply cuts or incisions in the patch and thus do not have any interior space for patch to compress upon itself. A slit that has some material removed (i.e., a slit with a substantial width) is generally referred to herein as a "slot," and may be used in either an expansion or a compression zone. Generally speaking, any interior forming feature where patch material has been removed from the middle of the feature may be used in either an expansion or a compression zone, and any interior forming feature where no patch material has been removed (e.g., a cut, incision, slit, etc.) may be used in an expansion zone.

Openings 42 are shown here as elongated openings that are generally rectangular in shape and extend into one of the projections 50. Of course, openings 42 may assume other shapes and be located in other positions than this. It is possible for a projection to include a single opening, multiple openings (as in FIG. 1B), no openings (as in FIG. 1C), or some other combination of interior and/or exterior forming features. As best illustrated in FIG. 1B, openings 42 are located in projection 50 which extends up the side of the wheel well and across a rather tight crease or bend 60 in main panel 12. During the stamping process that forms this tight crease, patch 16 will likely experience a significant amount of material movement or thinning in this area; thus, the need for openings 42, which can accommodate both expansion and compression forces around the crease. Some suitable shapes for openings 42 include, but are certainly not limited to: rectangles, squares, triangles, and other polygons, as well as ovals, circles, crescents, and irregular shapes having no specific name. Patch 16 may include a single opening 42, multiple openings spread around the patch, multiple openings clustered in certain areas of the patch, a combination of interior forming features that include one or more opening(s) plus one or more other interior forming features, as well as other embodiments.

Hole 44 is a simple circular opening in patch 16 and may be provided at a certain location in order to relieve strain or other forces acting at that location during a metal forming process. Hole 44 may be placed in an expansion or a compression zone, as explained above; but, it may also be located near some feature, like a weld or mechanical fastener, such that the hole relieves force or strain on the feature. For example, hole 44 in FIG. 1B does not extend across a pronounced crease or bend, as do openings 42. Instead, hole 44 may be located near a spot weld or other feature in the panel assembly such that when the panel is stamped, it relieves pressure from the spot weld and prevents it from being pulled apart. It is also possible for hole 44 to be a multifunctional interior forming feature where it both assists in the forming process and provides clearance for other parts, such as hoses, electrical wires, etc. In one embodiment, hole 44 is provided in a sound damping patch for a dash panel and assists in the forming process and also acts as a pass through for a steering column. Other uses, functions, locations and embodiments of hole 44 may be used instead. Patch 16 may include a single hole 44, multiple holes spread around the patch, multiple holes clustered in certain areas of the patch, a combination of interior forming features that include one or more hole(s) plus one or more other interior forming features, as well as other embodiments.

Slits 46 are cuts or incisions that may be strategically placed around patch 16 in order to aid in formability. According to the exemplary embodiment shown here, slits 46 are arc- or crescent-shaped incisions that are located near welds 62 so that they can relieve expansion or pulling pressures on the welds during a metal forming process, such as stamping. It is not necessary for slits 46 to be positioned near a weld or other feature, as they could be located in other locations of the patch in the same way as other interior forming features 30. In most embodiments, it is desirable for the slits to pass completely through the patch, however, this is not necessary as it is possible for a slit to only pass partially through the patch. If the slit only passes partially through the thickness of the patch, it could be designed to break or sever in a controlled manner during the metal forming process. The size, length, depth, shape, orientation, etc. of the slit is largely driven by the shape of the part being formed and/or the weld or other feature that is being protected. In some instances, it may be preferable for slit 46 to be aligned generally perpendicular to the strain lines or draw lines of the patch such that it pulls the slit apart during forming. Some exemplary slit shapes include, but are certainly not limited to: arcs, crescents, straight lines, wavy lines, broken lines, broken circles, etc. For instance, it is possible for slit 46 to extend more completely around weld 62 than that shown in FIGS. 1A-B or for the slit to include several disconnected arcs that surround the weld (i.e., a broken circle). In order to promote better forming, slit 46 may have small holes 48 located at one or both ends of the slit. Holes 48 provide additional clearance for patch material during the forming process, they help prevent tearing by blocking crack propagation at the end of the slit, and they can be a variety of different sizes. Patch 16 may include a single slit 46, multiple slits spread around the patch, multiple slits clustered in certain areas of the patch, a combination of interior forming features that include one or more slit(s) plus one or more other interior forming features, as well as other embodiments.

External forming feature 32 broadly includes any projection, finger, recess, waveform or other peripheral feature located along the perimeter of the patch that assists during a stamping, drawing or other metal forming process. As with internal forming features 30, external forming features 32 are designed to relieve force or strain on panel assembly 10 by providing means for expansion in an expansion zone and means for compression in a compression zone. Projections 50 and recesses 52 are two examples of external forming features that may be used along the perimeter of patch 16; other features and combinations of features are certainly possible. In some applications it is desirable for the patch 16 to have a large surface area and/or to extend to certain areas of the main panel 12 so that significant sound damping can occur, but this can present challenges during the metal forming process. In the exemplary wheel well shown in FIG. 1B, for example, it may be desirable for patch 16 to extend up the side wall of the wheel well and across crease or bend 60, as significant sound or vibrations may be emanating from this area. But stamping such a shape can result in a tearing or ripping of the patch. Thus, projections 50 and recesses 52 may work together to achieve the desired NVH characteristics, yet relieve some of the strain and forces that are acting upon this section of the patch. An example of a peripheral edge having projections and recesses is shown in U.S. Application No. 60/903,998, filed Feb. 28, 2007, which is incorporated herein by reference.

Projections 50 are located along the perimeter of patch 16 and may assume a variety of different shapes and sizes. The exemplary projections shown in FIGS. 1A-C, for instance, are generally rectangular projections that have a length greater than their width. This is not necessary, of course, as the projections may also be more finger-like or irregular in shape, can be shorter or longer than those shown here, or can be thinner or wider, to cite a few possibilities. It may also be desirable for projections 50 to exhibit certain length-to-width relationships that are related to the thickness of the sheet metal from which the projections are formed. Because exemplary projections 50 extend across a section of the wheel well having a rather significant curvature or a tight radius (i.e., crease 60), projections 50 are designed to spread during the metal forming process so that the patch can adhere to the ultimate shape of the part without ripping or tearing. In applications having greater curvatures, thinner projections of fingers may be preferable; in applications having lesser curvatures, thicker projections or fingers may be used. The shape and construction of projection 50 should be such that it does not easily delaminate at its distal end. Larger projections, more in the way of peninsulas as opposed to thin fingers, may also be used.

Recesses 52 are also located along the periphery of patch 16 and may have a variety of different shapes and sizes. In the exemplary embodiment shown here, recesses 52 are the spaces between projections 50; but this is not necessary. Recesses 52 may include any recessed feature located along the perimeter of the patch, including openings, holes, slits, slots, etc. that extend all the way out to the edge of the patch. To illustrate, if hole 44 were moved so that it was along the perimeter of patch 16, then it would generally be considered a recess, which in this case is an exterior forming feature. Neither interior nor exterior forming features 30, 32 are limited to any particular shapes or arrangements, as any suitable embodiments may be used.

Welds 62 may be located throughout patch 16 and are usually provided to help control material movement and prevent delamination during the metal forming process. As mentioned above, main panel 12 and patch 16 typically do not experience identical material flow when the panel assembly 10 undergoes a stamping or drawing operation. Welds 62 may address this issue by transferring loads from main panel 12 to patch 16 during such an operation, thereby reducing some of the stress that may otherwise be borne by adhesive layer 18. In the exemplary embodiment, welds 62 are located near the edge or perimeter of patch 16. It would also be possible to provide one or more welds out at the ends of projections 50 or elsewhere. According to one embodiment, patch 16 may include an alternating sequence of welds and interior/exterior forming features. For example, patch 16 may have a line of spot welds along one of the edges of the patch and a nearby and generally parallel line of holes located between the spot welds. Such a weld/hole combination may be useful in preventing forming forces from disrupting the welds.

As mentioned above, forming features 30, 32 may assist during a stamping, drawing or other metal forming process. One potential way to determine if a forming feature assists during such a process is to evaluate the amount of stretch, compression or other distortion experienced by the forming feature. If, for example, the forming feature experiences more than a 10% stretch, compression or distortion, then it may be assumed that the forming feature has assisted with the stamping, drawing or other metal forming process. The stretch, compression or other distortion discussed herein may be of a uni-axial, bi-axial or other multi-axial nature, and may include material flows ranging from the simple to the complex. Other evaluation methods may also be used to examine the role that forming features play in such metal forming processes.

Figures 2A, 2B:
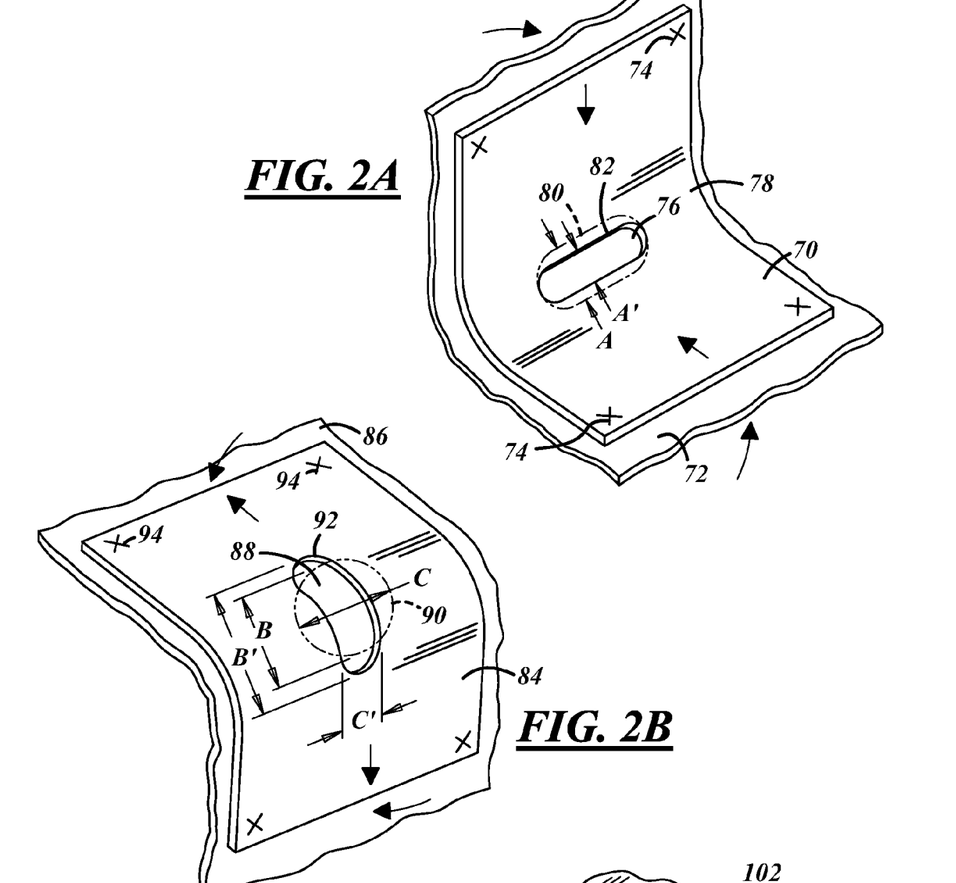
FIG. 2A is a perspective view of a portion of an exemplary panel assembly after it is subjected to a metal forming process, the panel assembly includes a main panel and a single sound damping patch that has an internal forming feature located in a compression zone.
FIGS. 2B and 2C are perspective views of portions of exemplary panel assemblies after they have been subjected to metal forming processes, each of the panel assemblies includes a main panel and a single sound damping patch that has an internal forming feature located in an expansion zone.
Figure 2C:
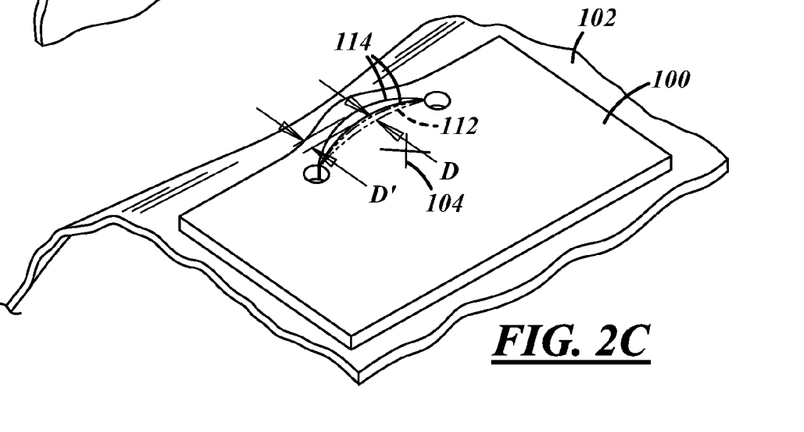

With reference to FIGS. 2A-2C, there is respectively shown an opening, a hole and a slit before and after they have undergone a metal forming process such as a stamping or drawing operation. Beginning with FIG. 2A, an exemplary sound damping patch 70 is attached to a main panel 72 via an adhesive layer and several welds 74, and includes an opening 76 located along a bend 78 in the part. Skilled artisans will appreciate that during a metal forming process that creates bend 78, there may be material flow in a number of directions, including flow towards the center of the opening due to a compressive load. The effects of this compressive load can be seen on opening 76, which has a pre-forming border 80 with a dimension A and a post-forming border 82 with a dimension A'. By allowing material to flow into opening 76 during the metal forming process, the border of the opening is constricted or compressed so that wrinkles can be avoided in that area. The amount of compression or distortion, as illustrated by dimensions A and A', is greater than 10%; thus, opening 76 has assisted during the metal forming process in this particular example.

FIG. 2B shows a sound damping patch 84 attached to a main panel or blank 86, where the patch includes a hole 88 with pre- and post-forming borders 90, 92. A pair of optional welds 94 transfers the load, strain or other forming forces around the hole, and may be strategically located. In this particular embodiment, there are two spot welds, however, more or less or different types of welds may be used instead. For instance, it is possible to provide one or more seam welds—for example, with a laser welder—along certain portions of the patch so that the patch and main panel are welded along a distance as opposed to only being welded at spots. As demonstrated in FIG. 2B, when there is material flow caused by an expansive force, hole 88 may elongate and change in shape from a circular form to a more oblong or oval form. This may result in a pre-forming dimension B expanding and becoming a larger post-forming dimension B', as well as pre-forming dimension C contracting and becoming a smaller post-forming dimension C', or some combination thereof. In this particular example, dimension B, B' has expanded by more than 10%; thus, indicating that hole 88 has assisted during the metal forming process. If there are biaxial stresses on patch 84 near hole 88, the borders of the hole could expand and/or contract in other directions.

Turning now to FIG. 2C, there is shown a sound damping patch 100 attached to a main panel or blank 102 with an adhesive layer and a spot weld 104. In order to protect the spot weld from excessive strain, load or other forces during a metal forming process, a slit 110 has been formed near weld 104 and is designed to receive and deflect some of the forming forces. Slit 110 has a pre-forming border 112 and a post-forming border 114. As illustrated, the slit may be pulled apart and opened during the forming process instead of the weld giving way. In this particular example, slit 110 was initially formed as a thin incision or slit having a width D, but it was pulled apart somewhat during manufacture to become a slot having a post-forming width D'. The distance that the slit was pulled apart, as demonstrated by dimensions D and D', is greater than 10% of the original width of the narrow incision. It can therefore be assumed that slit 110 has assisted during this exemplary metal forming process.

Although FIGS. 2A-C demonstrate some of the metrics or parameters that may be used to determine if a forming feature has assisted in a metal forming process, they are not the only criteria. Other criteria may also be used in order to determine if a forming feature has assisted or aided in a stamping, drawing or other metal forming process. Moreover, the pre- and post-forming borders and the material flow distortions shown in FIGS. 2A-C are merely exemplary and are provided simply for purposes of illustration. Other borders and material flow distortions are certainly possible.

In an exemplary forming process, the sound damping patch 14 is applied to main blank 12 before either part is stamped, drawn or otherwise formed into a finished part. In one embodiment, both the sound damping patch and the main blank are flat planar pieces at the time that they are adhered and/or spot welded together. Any number of adhesion and/or spot welding patterns may be used to better maintain the two work pieces together in a subsequent forming process; such a technique may reduce the discrepancies in material flow between the sound damping patch and the main blank. It may be preferable to adhere the patch first, and then add the spot welds after the adhesive layer has cured. After the sound damping patch 14 is adequately attached to the main blank 12, such as by an adhesive layer, spot welds, etc., both components can be put through a stamping, drawing, or other forming process together. This process ensures that the resultant part has a more integrated form with tighter tolerances and better correspondence between the main blank 12 and sound damping patch 14. Skilled artisans will appreciate that an assembly process that uses already formed patches and main panels with three-dimensional configurations can be challenging, as they have to mate with one another in a rather precise way. Such a combined stamping, drawing or forming process also results in the elimination of a manufacturing step, as the sound damping patch and main blank do not need to be separately stamped. The metal forming process may be a single- or multi-step process. Other advantages may also exist from using a combined forming process like the one described above.

The preceding descriptions of interior and exterior forming features, as well as other aspects of the sound damping patch and panel assembly, also apply to the exemplary embodiments shown in FIGS. 3A-4B. Thus, duplicate descriptions and reiterations have been omitted here.

Figures 3A, 3B:
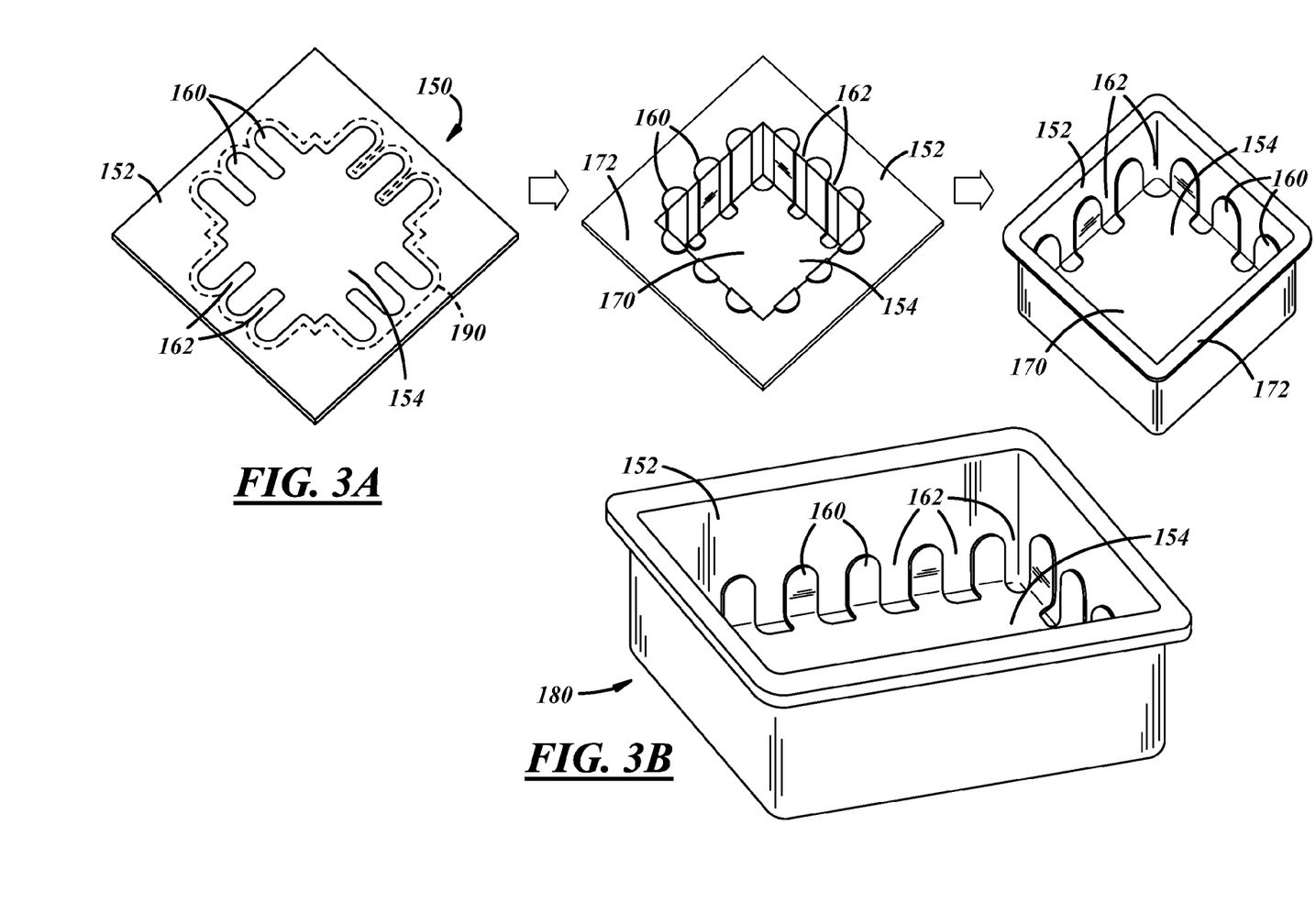
FIG. 3A is a perspective view of an exemplary panel assembly being subjected to a metal forming process, which in this case is a multi-step drawing process, in order to become a vehicle seat tub.
FIG. 3B is a perspective view of the exemplary vehicle seat tub of FIG. 3A.

FIG. 3A generally illustrates a metal forming process for a vehicle seat tub, such as the type that accommodates folding seats and the like. Initially, a panel assembly 150 is provided that includes a main panel 152 and a patch 154. The patch includes a series of projections and recesses 160, 162 around the perimeter of the patch (i.e., external forming features) which help reduce noise or vibrations but also assist or help in a two-stage drawing process. A first draw step produces a deep cavern or indentation 170 and a flange or lip 172 in the panel assembly such that the alternating series of projections and recesses 160, 162 extend up the indentation side walls. A second draw step further forms the indentation or interior 170 of the part and finishes off edges 172 of the seat tub. At this point, a finished part or vehicle seat tub 180 is formed with exterior forming features in the form of projections and recesses 160, 162 extending partially up the sidewalls. It is certainly possible for these exterior forming features to extend further or shorter than those illustrated in the drawings, or for patch 154 to include some combination of internal and/or external forming features. It is also possible for the sound damping patch 154 to be located on the opposite side of the seat tub (i.e., the exterior side) or on both sides of the seat tub, as opposed to only being attached to the interior side of the seat tub.

In an exemplary embodiment, the drawing dies that are used to form seat tub 180 may include certain profiled pads for gripping or contacting the binder material of main panel 152. With reference to FIG. 3A, for example, there is shown an outline or footprint 190 of an exemplary pad for an upper die which is designed so that the pad may contact a binder area of main panel 152 without contacting sound damping patch 154 (i.e., the upper pad would stop short of contacting the patch). The pad could be designed to partially extend in the recesses 162 that are in between projections or fingers 160, or it could be designed to avoid going into the recesses all together. Both situations are illustrated in FIG. 3A. It is also possible for the pad to contact binder material on both main panel 152 and sound damping patch 154 on some sides of the part, but only contact the main panel on other sides. The particular arrangement of the upper pad is largely driven by the specific part being formed, and may vary accordingly.

Figure 4A:
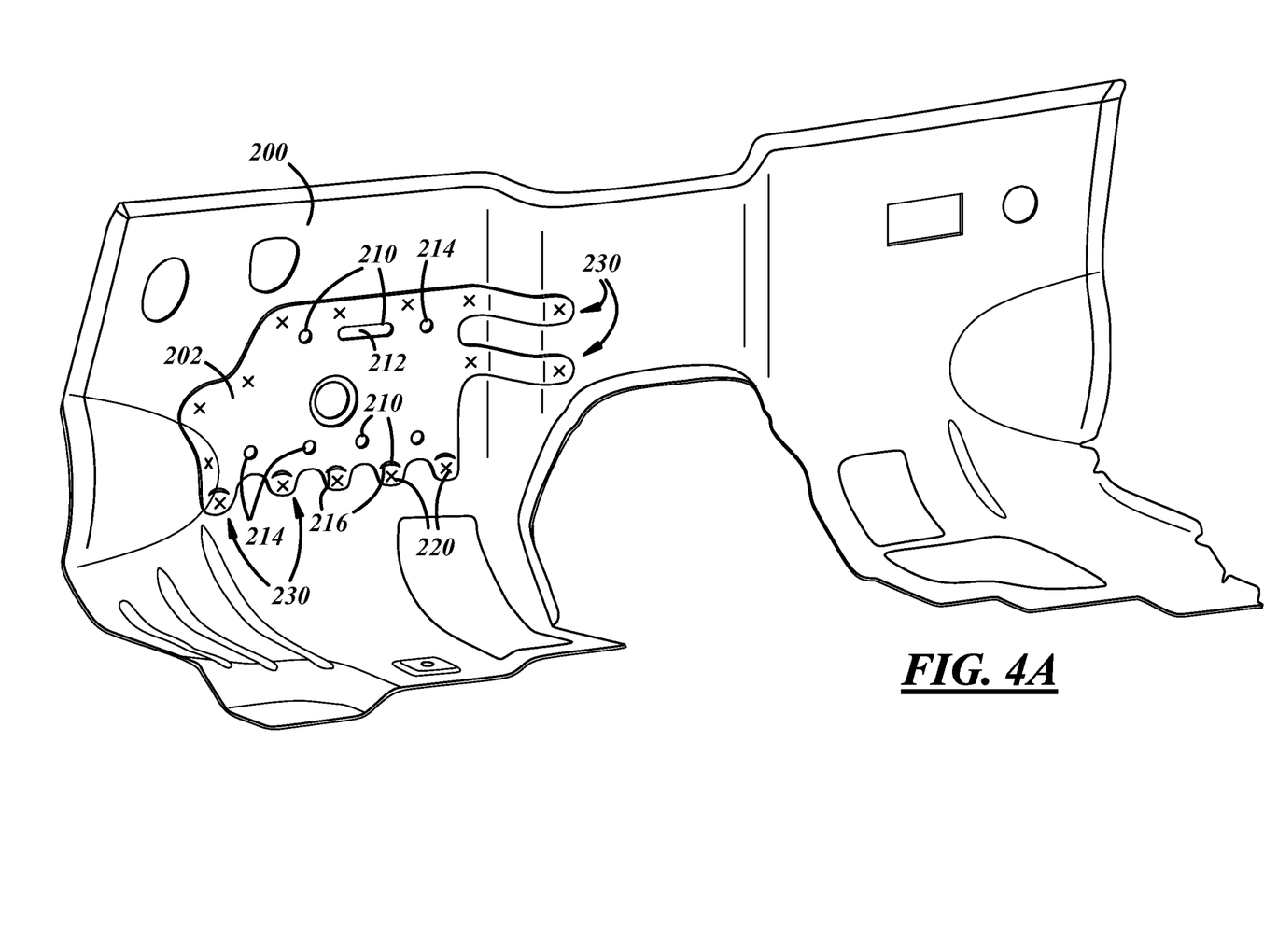
FIG. 4A is a perspective view of an exemplary vehicle dash panel, the vehicle dash panel includes a main panel and a single sound damping patch.
Figure 4B:
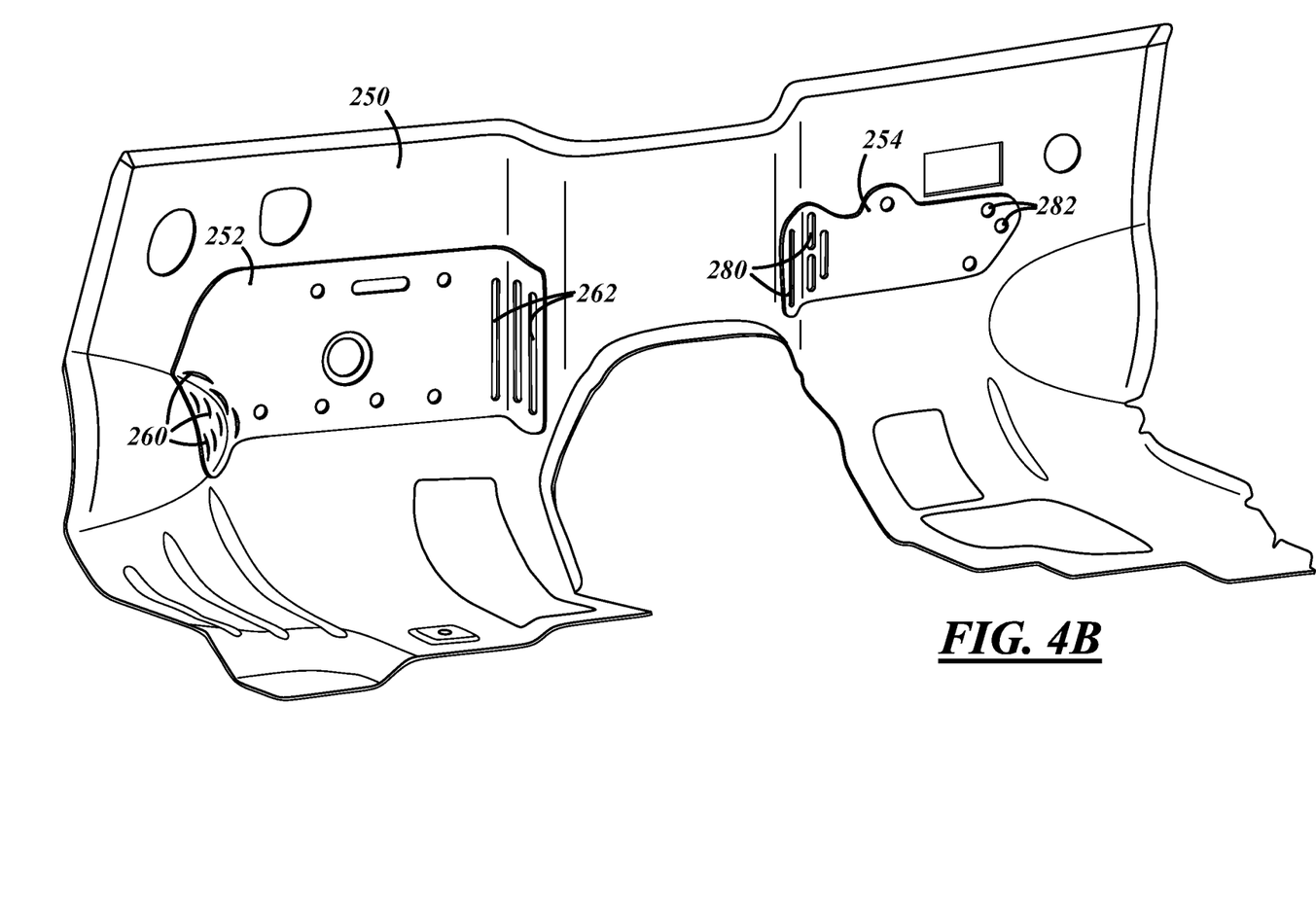
FIG. 4B is a perspective view of another exemplary vehicle dash panel, this vehicle dash panel includes a main panel and two separate sound damping patches.

FIGS. 4A-B illustrate two different embodiments for a vehicle dash panel assembly, where the dash panel assembly of FIG. 4A has a main panel 200 with only a single sound damping patch 202 and the dash panel assembly of FIG. 4B has a main panel 250 with multiple sound damping patches 252, 254. It should be appreciated that any number of sound damping patches may be applied to a main panel or blank, and the exemplary wheel well, seat tub and dash panel applications shown here are not limited to the specific embodiments disclosed. It is even possible for a main panel and/or a sound damping patch to be provided in the form of a tailor-welded blank, a laminate, or some other multi-component construction.

Sound damping patch 202 includes a number of both interior and exterior forming features located throughout the patch. Interior forming features 210 include an opening 212 (the other opening may allow a steering column to pass through), holes 214, and slits 216. Holes 214 and slits 216 are generally located along an edge or side of patch 202 and may protect a series of welds 220 located nearby. As previously mentioned, the alternating and offset arrangement of holes and welds, can relieve the spot welds of what is sometimes tremendous pressure exerted during a metal forming process. Exterior forming features 230 can assist in metal forming, yet provide NVH characteristics that are desired for the dash panel. Other combinations of forming features could certainly be used.

In the embodiment of FIG. 4B, a pair of sound damping patches 252, 254 are affixed to dash panel 250 in positions that may help mitigate noise or vibration. In this particular example, sound damping patch 252 includes a series of slits 260 located in an area of great contour; these interior forming features may be particularly helpful if this area is in an expansion zone. The sound damping patch also includes several slots 262 located on the other side of the patch. These slots are shown here in generally parallel alignment somewhat like gills, although this is not necessary, and can assist with either expansion or compression zones, as previously described. Sound damping patch 254 includes some slots or openings 280, as well as some holes 282. It should be appreciated that any combination of interior and/or exterior forming features may be used with the sound damping patch described herein. These features may enable one to manipulate material flow characteristics of a stamping, drawing or other forming process without having to retool the upper and/or lower dies, which can be a rather costly and timely endeavor. Instead, the change can be in the main panel and/or the sound damping patch and not in the forming tools.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A panel assembly, comprising:
a main panel made from a metal;
a sound damping patch made from a metal and including at least one forming feature that is configured to stretch, compress or both and is positioned on the sound damping patch at a location where it assists with formability of the panel assembly during a metal stamping or drawing process involving complex material flow; and an adhesive layer joining the sound damping patch to the main panel, wherein the sound damping patch reduces noise or vibrations in the panel assembly.

2. The panel assembly of claim 1, wherein the adhesive layer is made from a viscoelastic adhesive that joins the sound damping patch to the main panel so that the panel assembly operates in a constrained damping layer capacity.

3. The panel assembly of claim 1, wherein the sound damping patch includes at least one internal forming feature that is located in the interior of the sound damping patch and assists with formability during the metal stamping or drawing process.

4. The panel assembly of claim 3, wherein the internal forming feature is located in an expansion zone of the sound damping patch and includes at least one feature selected from the group consisting of: an opening, a hole, a slit, or a slot.

5. The panel assembly of claim 3, wherein the internal forming feature is located in a compression zone of the sound damping patch and includes at least one feature selected from the group consisting of: an opening, a hole, or a slot.

6. The panel assembly of claim 1, wherein the sound damping patch includes a plurality of internal forming features that are located in the interior of the sound damping patch and assist with formability during the metal stamping or drawing process.

7. The panel assembly of claim 6, wherein the plurality of internal forming features includes a first internal forming feature that includes an opening, a hole, a slot or a slit and a second internal forming feature that includes an opening, a hole, a slot or a slit, and the first and second internal forming features are different types of internal forming features.

8. The panel assembly of claim 1, wherein the sound damping patch includes at least one external forming feature that is located along the perimeter of the sound damping patch and assists with formability during the metal stamping or drawing process.

9. The panel assembly of claim 8, wherein the external forming feature includes at least one feature selected from the group consisting of: a projection, a finger, a recess or a waveform.

10. The panel assembly of claim 1, wherein the sound damping patch includes a plurality of external forming features that are located along the perimeter of the sound damping patch and assist with formability during the metal stamping or drawing process.

11. The panel assembly of claim 10, wherein the plurality of external forming features includes a first external forming feature that includes a projection or a recess and a second external forming feature that includes a projection or a recess, and the first and second external forming features are different types of external forming features.

12. The panel assembly of claim 1, wherein the sound damping patch includes both internal and external forming features that assist with formability during the metal stamping or drawing process.

13. The panel assembly of claim 12, wherein the internal forming feature is an opening, a hole, a slot, or a slit and the internal forming feature is generally located within an external forming feature that is a projection.

14. The panel assembly of claim 1, further comprising:
at least one weld that joins the sound damping patch to the main panel, wherein the forming feature is strategically located near the weld and is generally perpendicular to strain lines or draw lines of the sound damping patch so that the forming feature relieves some stress or pressure on the weld during the metal stamping or drawing process.

15. A vehicle wheel well made from the panel assembly of claim 1, wherein the main panel forms the wheel well and the sound damping patch reduces noise or vibrations emanating from a vehicle wheel.

16. A vehicle seat tub made from the panel assembly of claim 1, wherein the main panel forms the seat tub and the sound damping patch reduces noise or vibrations emanating from outside of the vehicle.

17. A vehicle dash panel made from the panel assembly of claim 1, wherein the main panel forms the dash panel and the sound damping patch reduces noise or vibrations emanating from an engine compartment.

18. A panel assembly, comprising:
a main panel made from a metal;
a sound damping patch made from a metal and including at least one internal forming feature that is configured to stretch, compress or experience other distortion and is positioned in the interior of the sound damping patch at a location so that it assists with formability during a metal forming process; and
an adhesive layer joining the sound damping patch to the main panel, wherein the sound damping patch reduces noise or vibrations in the panel assembly;
wherein the internal forming feature is located in an expansion zone of the sound damping patch and includes at least one feature selected from the group consisting of: an opening, a hole, a slit, or a slot, and the internal forming feature has a pre-forming border with a first dimension and a post-forming border with a second dimension, and during a metal forming process the first dimension expands by at least 10% to result in the second dimension.

19. A panel assembly, comprising:
a main panel made from a metal;
a sound damping patch made from a metal and including at least one internal forming feature that is configured to stretch, compress or experience other distortion and is positioned in the interior of the sound damping patch at a location so that it assists with formability during a metal forming process; and
an adhesive layer joining the sound damping patch to the main panel, wherein the sound damping patch reduces noise or vibrations in the panel assembly;
wherein the internal forming feature is located in a compression zone of the sound damping patch and includes at least one feature selected from the group consisting of: an opening, a hole, or a slot, and the internal forming feature has a pre-forming border with a first dimension and a post-forming border with a second dimension, and during a metal forming process the first dimension compresses by at least 10% to result in the second dimension.

20. A method of forming a panel assembly, comprising the steps of:
(a) providing a main panel made from a metal;
(b) providing a sound damping patch made from a metal, wherein the sound damping patch includes at least one forming feature that is configured to stretch, compress or both and is positioned on the sound damping patch at a location so that it assists with formability during a subsequent metal forming process;
(c) joining the sound damping patch to the main panel with an adhesive layer to form the panel assembly; and
(d) using a metal forming process involving complex material flow to form the panel assembly into a formed part, wherein the forming feature relieves force or strain on the panel assembly so that the panel assembly can be formed by the metal forming process without experiencing creasing or wrinkling in either the main panel or the sound damping patch.

21. A panel assembly, comprising:

a main panel made from a metal;

a sound damping patch made from a metal and including at least one forming feature that is configured to stretch, compress or both and is positioned on the sound damping patch at a location where it assists with formability during a metal stamping or drawing process, the sound damping patch reduces noise or vibrations in the panel assembly;

an adhesive layer joining the sound damping patch to the main panel; and at least one weld also joining the sound damping patch to the main panel, wherein the forming feature is strategically located near the weld and along strain or draw lines in order to relieve stress or pressure on the weld during the metal stamping or drawing process.

* * * * *